(No Model.) 3 Sheets—Sheet 1.

A. BLASCO y FABREGAS.
Wheelwright Machine.

No. 238,099. Patented Feb. 22, 1881.

WITNESSES: INVENTOR:
Donn P. Twitchell Agustin Blasco y Fabregas
C. Sedgwick BY Munn & Co
ATTORNEYS.

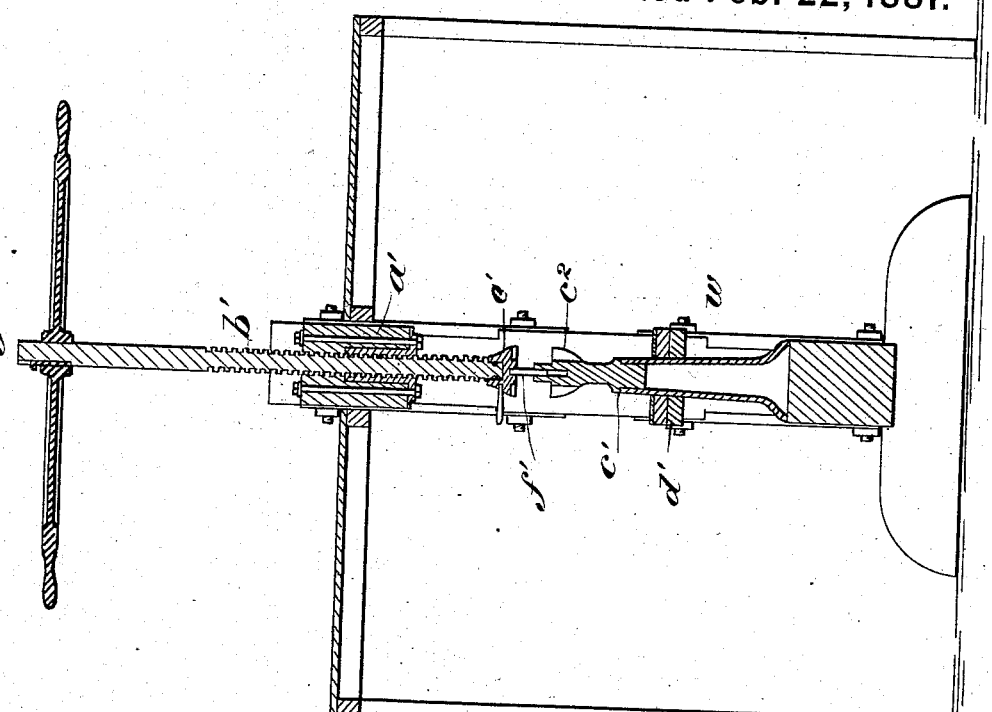
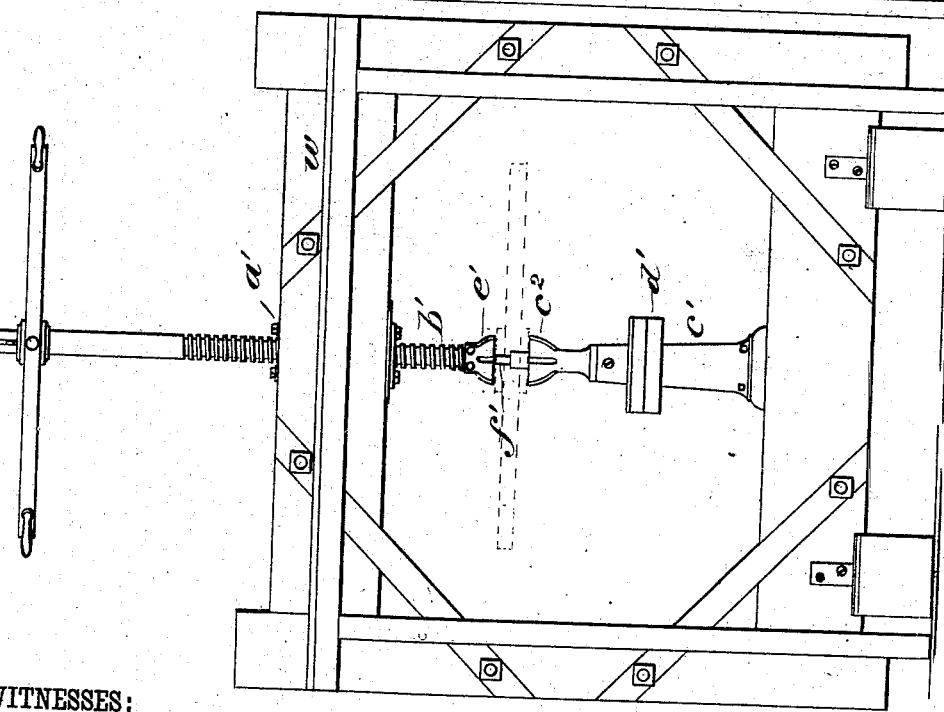

(No Model.) 3 Sheets—Sheet 3.

A. BLASCO y FABREGAS.
Wheelwright Machine.

No. 238,099. Patented Feb. 22, 1881.

WITNESSES:
H. B. Brown
John E. Kenon

INVENTOR:
Agustin Blasco y Fabregas
BY
ATTORNEYS.

UNITED STATES PATENT OFFICE.

AGUSTIN BLASCO Y FABREGAS, OF BARCELONA, SPAIN.

WHEELWRIGHT-MACHINE.

SPECIFICATION forming part of Letters Patent No. 238,099, dated February 22, 1881.

Application filed December 20, 1880. (No model.) Patented in Philippine Islands April 8, 1879.

*To all whom it may concern:*

Be it known that I, AGUSTIN BLASCO Y FABREGAS, of Barcelona, Spain, have invented a new and Improved Apparatus and Method for Manufacture of a Vehicle-Wheel; and I do hereby declare that the following is a full, clear, and exact description of the same.

I have invented an improved vehicle-wheel, and made application for Letters Patent for the same in the United States.

The present invention relates to an apparatus which is particularly adapted for use in manufacturing such wheel; and it relates also to a method of putting, pressing, and securing together the parts forming the hub proper. The felly of the wheel is composed of laminæ of wood, and the hub proper is formed of the butts of the spokes, having a dovetailed shape; also wooden and metal rings that fit on opposite sides of the spoke-butts, and are firmly clamped in place by means of screws that pass transversely through all the parts. The apparatus is adapted for holding the laminæ of the felly while being successively put in place, also while the spokes are being inserted and the hub parts applied. The apparatus enables the parts of the wheel to be quickly and cheaply put together, and is therefore practically indispensable for that purpose. The parts composing the hub proper are forced together by powerful pressure applied by the press shown in Figs. 3 and 4.

Figure 1:
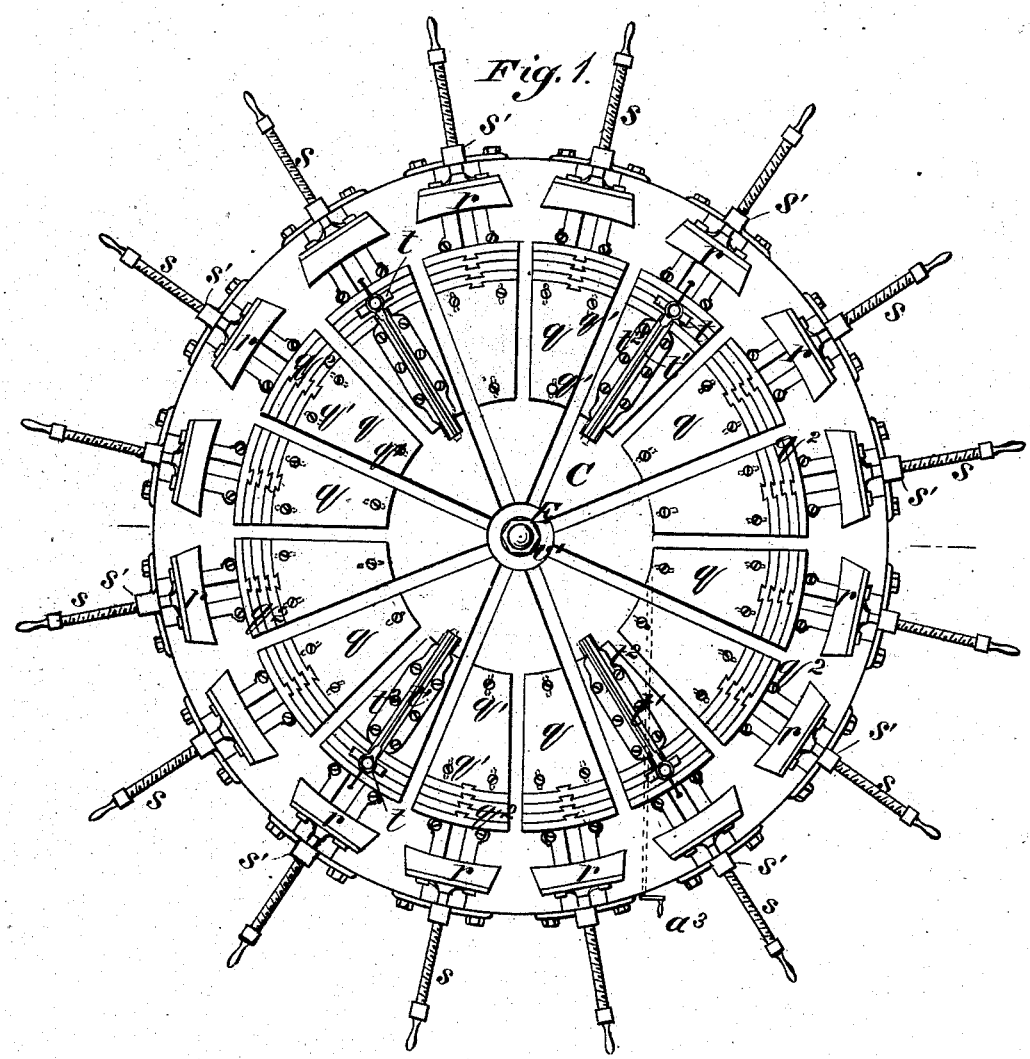
Figure 2:
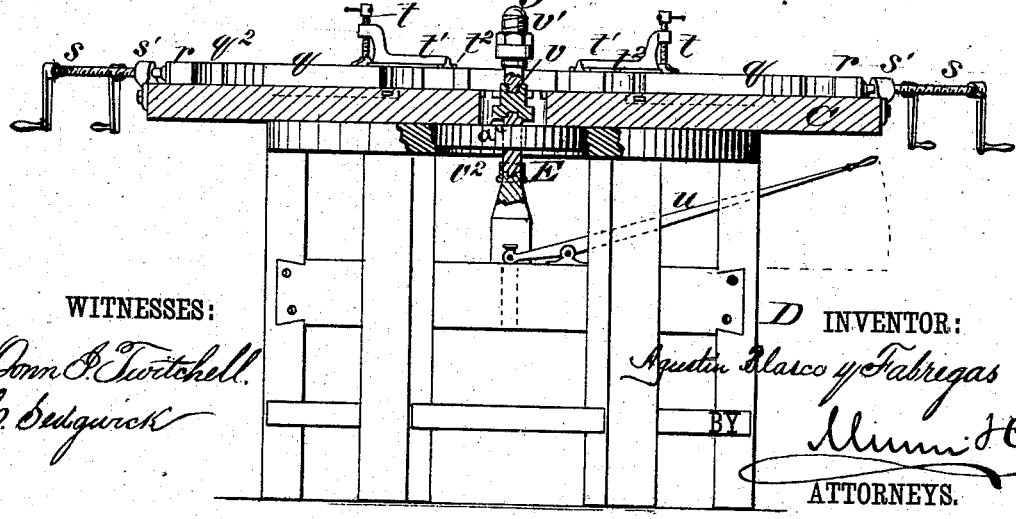
Figure 5:
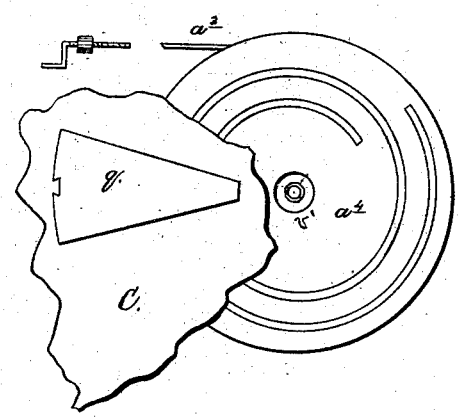
Figure 6:
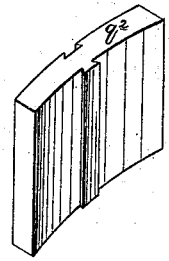
Figure 7:
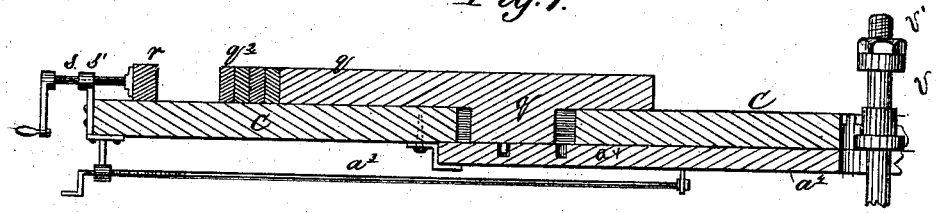
Figure 8:
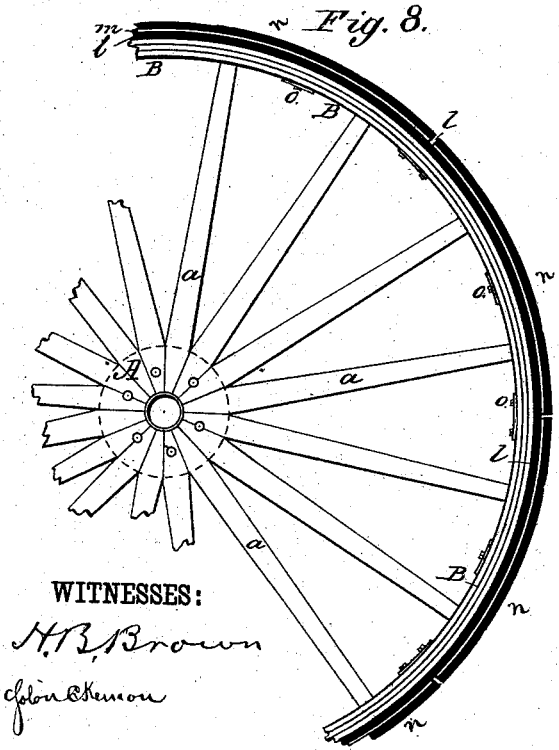
Figure 9:
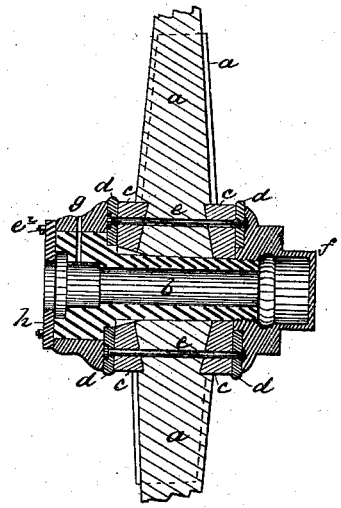

In accompanying drawings, Figure 1 is a plan view, and Fig. 2 a cross-section, of the apparatus. Fig. 3 is a side view, and Fig. 4 a vertical section, of the press used for finishing the wheel. Fig. 5 is a detail plan view, showing the mechanism for adjusting the segments *q*. Fig. 6 is a perspective view of one of the "sizers" or re-enforcing strips applied to the outer ends of the segments *q*. Fig. 7 is a detail central vertical section of the apparatus shown in Fig. 1. Fig. 8 is a plan view of a portion of the wheel for whose manufacture the apparatus is especially adapted. Fig. 9 is a central vertical section of the wheel-hub.

Referring first to Figs. 8 and 9, showing the wheel, the hub A is formed by the dovetail ends of spokes *a*, wooden concave plates or rings *c c* around the box *b* on opposite sides of the spokes, and outer iron clamping-rings, *d d*, which parts are tied together by short screw-bolts *e* and long bolts $e^2$, passing through from side to side. In addition, a nut, *f*, formed in one piece with a dust-cap, is screwed on the outer end of the axle journal-box *b*, a wooden collar, *g*, is placed upon the inner end of the box *b*, to give a finished appearance, and to that is secured a metal ring, *h*.

The continuous felly B is formed of two, three, or more laminæ or strips of wood laid one upon another, so as to break joints, and held together or in place by means of a continuous iron tire, *l*. Upon the latter are laid strips *m*, of leather, which form an elastic layer, that compensates for concussions or shocks incident to use of the wheel on stony or rough pavements or roads. Segmental steel wearing-plates *n* are secured upon the leather strips *m*, and said parts of the wheel-rim are bound together by screw-bolts *o*. The plates *n* are separated at their ends to allow for expansion.

The apparatus used for the manufacture of the wheel is shown in Figs. 1 to 7, inclusive. Referring in the first instance to Figs. 1, 2, 5, 6, 7, C is a circular table, supported by a suitable frame, D. *q q* are radial segments or sector-shaped blocks laid on table C, and adapted to be adjusted to and from the center of the table by means hereinafter described. The outer ends of segments, *q*, are fitted with strips $q^2$, which may be termed "sizers" or "re-enforcers," in view of their function. These sizers are held in place by dovetail tenons, so that they are removable to vary the radial length of the segments *q* to suit the size of wheel. *r* are slides, corresponding in number with segments *q*, formed with tongues that enter grooves in table C, and attached on the ends of screws *s*, that are tapped into lugs *s'*, fixed on the edge of table C, so that by operation of screws *s* the slides are moved radially on the table to and from segments *q*.

*t* are clamping-screws, tapped for vertical movement in slides *t'*, that are fitted to move in grooved-plates $t^2$, attached to segments *q*. There are four screws *t*, placed at suitable distances apart around the table.

The table C is centrally apertured. Through the aperture extends the upper end of a spindle, E, that is carried by a hand-lever, u, hung on frame D, and the lower end of the spindle moves in a cross-bar of the frame, so that the spindle is held centrally in the aperture. The upper portion, u, of the spindle E is made as a removable gudgeon, fitted to screw upon the lower portion. The upper end is also fitted with a nut, $v'$, and a frame, $v^2$, between which nut and flange the hub of the wheel is to be clamped.

For finishing the wheel I employ a press, which is shown in Figs. 3 and 4. Said press I do not claim as new *per se;* but it is indispensable for carrying out my method of manufacturing the wheel. It consists of an upright rectangular frame, w, having its upper bar fitted with a nut, $a'$, and screw $b'$, and its lower bar fitted with a post, $c'$, carrying a ring or rings, $d'$. The lower end of screw $b'$ is formed with a loose collar, $e'$, adapted for setting upon one end of the hub, and the upper end of post $c'$ is formed to enter the hub, and has flanges $c^2$, against which the end of the hub takes. The collar $l'$ and upper end of post $c'$ are retained in line by a pin, $f'$, extending from one to the other at the center.

The segments $q$ being first set for the size of felly desired, the laminæ of wood are placed around the segments $q$, one outside the other, and so that the joint of each layer is covered by an outer layer, and the slides $r$ and screws $t$ are moved to clamp the strips securely. The felly is then bored and screws $k$ driven into the felly through holes provided in slides $r$, and the felly is bored between the slides $r$, to receive the spokes. The gudgeon $v$ being removed, one plate $c$ and ring is put on the spindle, resting on flange $v^2$. The spokes are put in place one by one by first inserting the tenon into the felly, and the other plate $c$ and ring $d$ are put on the spokes. The gudgeon $v$ is then screwed upon the spindle, nut $v'$ screwed down to clamp the parts firmly, the hub is bored, and the screws $e$ then put in to hold these parts together. Before the spokes are put in place the spindle will be raised by lever $u$ more or less, according to the dish desired for the wheel; and to give the required offset to the alternate spokes they will be formed with their dovetail ends out of center, and will be inserted in the machine reversed alternately. The wheel is then taken out of the machine, the continuous tire $l$ put on, and it is then put in the press, Figs. 3 and 4, with the hub clamped tightly between the collar $l'$ of the screw and the flanges $c^2$ of the post $c'$, the collar $g$ having been first put on, the screw is brought down against the hub, and the long bolts $e^2$ are forced through the hub. The holes for bolts $e^2$ may be bored while the wheel is in the press, and the rings $d$ serve as a support for the tools used in boring and in forcing the bolts to place. The wheel is then to be removed, box $b$ inserted, and ring $h$ secured on the ends of bolts $e^2$ by nuts. The bolts $e^2$ $e^2$ take by their heads on one ring, $d$, and screw into the other ring, the heads being on reverse sides of the hub. After the long bolts $e^2$ are in place the hub is securely held, and the collar $g$ may therefore be put on after the wheel is taken from the press. It will thus be understood that the parts which form the hub proper—to wit, the rings and butts of the spokes—are placed in the proper position in the apparatus, (shown in Figs. 1 and 2,) and that screws are inserted to hold said parts together while the wheel is being transferred to the press. (Shown in Figs. 3 and 4.) The press forces the parts of the hub together with so powerful pressure that the hub acquires the great solidity which is requisite to the desired degree of strength and durability. Other bolts are next inserted, and thereby the hub parts are held together in the same position, and firm contact resulting from such operation of the press.

In Figs. 5 and 7, at $a^3$, is shown a shaft provided with a crank-handle, which is arranged in connection with a spirally-grooved plate, $a^4$, Fig. 5, that is adapted to revolve around the gudgeon $v$, being placed under the table, to give a simultaneous movement radially to all the segments $q$, for the purpose of placing them in the required position for application of the felly-strips before the screws are inserted, and also to loosen the felly, to permit removal of the wheel when its parts have been adjusted and fitted together in the proper relation.

The shaft $a^3$ is screw-threaded near its outer end where it passes through a hanger pendent from the table C. Hence, by rotating the shaft, it is caused to move lengthwise through the hanger, and thus rotates the disk $a^4$, which moves the segments $q$.

What I claim as new is—

1. In an apparatus for use in manufacture of vehicle-wheels, the combination of the segments $q$, arranged horizontally on a table, the clamping-screws $t$, arranged vertically in a suitable support, and the screw-operated slides $r$, all as shown and described.

2. In an apparatus for manufacturing vehicle-wheels, the combination, with the table C, peripheral or tire clamps, and segments $q$, arranged thereon, of the spiral grooved revoluble disk suspended concentrically beneath the table, and a screw-threaded crank-shaft arranged as shown, to adjust the disk for the purpose of drawing back the segments when required to release the wheel-rim, as set forth.

3. In a machine for forming wheels, the combination, with segments arranged radially, of sizers or re-enforcers $q^2$, which are provided with dovetail vertical ribs, to adapt them for convenient detachment and removal, as shown and described.

4. In the manufacture of vehicle-wheels, the method hereinbefore described, which consists in placing in the required local relation the rings and spokes composing the hub proper, and, after the spokes are permanently attached to the rim of the wheel, inserting screws for temporarily confining them in horizontal position, and applying the heavy pressure requisite to force and hold the parts together, and then inserting the remaining screws to form the complete hub, as set forth.

AGUSTIN BLASCO Y FABREGAS.

Witnesses:
AMOS W. HART,
CHAS. A. PETTIT.